US012205240B2

(12) United States Patent
Wang

(10) Patent No.: US 12,205,240 B2
(45) Date of Patent: Jan. 21, 2025

(54) PANORAMIC IMAGE AND VIDEO SPLICING METHOD, COMPUTER-READABLE STORAGE MEDIUM, AND PANORAMIC CAMERA

(71) Applicant: ARASHI VISION INC., Shenzhen (CN)

(72) Inventor: Guo Wang, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 466 days.

(21) Appl. No.: 17/615,571

(22) PCT Filed: May 26, 2020

(86) PCT No.: PCT/CN2020/092344
§ 371 (c)(1),
(2) Date: Nov. 30, 2021

(87) PCT Pub. No.: WO2020/238897
PCT Pub. Date: Dec. 3, 2020

(65) Prior Publication Data
US 2022/0237736 A1 Jul. 28, 2022

(30) Foreign Application Priority Data
May 30, 2019 (CN) .......................... 201910464435.4

(51) Int. Cl.
*G06T 3/4038* (2024.01)
*G06T 3/047* (2024.01)
(Continued)

(52) U.S. Cl.
CPC ............ *G06T 3/4038* (2013.01); *G06T 3/047* (2024.01); *G06V 10/26* (2022.01); *H04N 23/698* (2023.01); *G06T 2200/32* (2013.01)

(58) Field of Classification Search
CPC . G06T 2207/20228; G06T 2207/20021; G06T 7/12; G06T 7/13; G06T 7/174;
(Continued)

(56) References Cited

U.S. PATENT DOCUMENTS

2011/0026834 A1* 2/2011 Hirasawa ................. G06T 7/97
382/203
2016/0188559 A1* 6/2016 Maltz .................. H04N 1/3873
358/1.15
(Continued)

FOREIGN PATENT DOCUMENTS

| CN | 103971375 A | 8/2014 |
|---|---|---|
| CN | 104104911 A | 10/2014 |
| CN | 105678729 A | 6/2016 |
| CN | 110189256 A | 8/2019 |

OTHER PUBLICATIONS

Zhuang, Yi, Xinrong Hu, and Jianchun Wang. "The implement of an image stitching algorithm based on feature extraction." 2009 Second International Conference on Education Technology and Training. IEEE, 2009. (Year: 2009).*
(Continued)

*Primary Examiner* — Emily C Terrell
*Assistant Examiner* — Stefano Anthony Dardano
(74) *Attorney, Agent, or Firm* — XSENSUS LLP

(57) ABSTRACT

The present invention is applicable to the fields of panoramic images and videos, and provides a panoramic image and video splicing method, and a panoramic camera. In the present invention, fisheye photos captured by two adjacent cameras are mapped to corresponding seam areas of a sphere model, so as to form two strip graphs having overlapping areas; performing block template matching on the two strip graphs to obtain an initial template matching result; performing matching filtering on the initial template matching result by using an area expansion-based matching filtering
(Continued)

algorithm, so as to obtain a final matching result; and updating a mapping relationship between the fisheye photos and the corresponding seam areas of the sphere model, and performing panoramic splicing according to the updated mapping relationship to obtain a seamless panoramic image.

15 Claims, 5 Drawing Sheets

(51) Int. Cl.
  *G06V 10/26* (2022.01)
  *H04N 23/698* (2023.01)
(58) Field of Classification Search
  CPC .............. G06T 7/73; G06T 2200/32; G06T 2207/10021; G06T 3/047; G06T 3/08; G06T 3/4038; G06T 7/593; G06T 2207/10012; G06T 2207/20221; G06T 5/80; G06V 10/26; G06V 10/751; G06F 18/23; H04N 2013/0081; H04N 23/698
  See application file for complete search history.

(56) References Cited

U.S. PATENT DOCUMENTS

2018/0332222 A1   11/2018  Yao et al.
2020/0244879 A1*  7/2020  Hohjoh ................ H04N 23/80

OTHER PUBLICATIONS

Souza, Tancredo, et al. "360 stitching from dual-fisheye cameras based on feature cluster matching." 2018 31st SIBGRAPI conference on graphics, patterns and images (SIBGRAPI). IEEE, 2018. (Year: 2018).*

Lhuillier, Maxime, and Long Quan. "Match propagation for image-based modeling and rendering." IEEE Transactions on Pattern Analysis and Machine Intelligence 24.8 (2002): 1140-1146. (Year: 2002).*

Tuan Ho, Ioannis D. Schizas, K. R. Rao, Madhukar Budagavi, "360-Degree Video Stitching For Dual-Fisheye Lens Cameras Based On Rigid Moving Least Squares", IEEE 2017 International Conference on Image Processing (ICIP 2017), Sep. 17-20, 2017, 5 Pages, IEEE, Beijing, China.

* cited by examiner

PANORAMIC IMAGE AND VIDEO SPLICING METHOD, COMPUTER-READABLE STORAGE MEDIUM, AND PANORAMIC CAMERA

CROSS REFERENCE TO RELATED APPLICATIONS

The present application is a 35 U.S.C. § 371 National Phase conversion of International (PCT) Patent Application No. PCT/CN2020/092344, filed on May 26, 2020, which claims benefit of a Chinese Patent Application No. 201910464435.4, filed on May 30, 2019, the disclosure of which is incorporated by reference herein. The PCT International Patent Application was filed and published in Chinese.

FIELD OF THE INVENTION

The present invention lies in the field of panoramic images and videos, and particularly relates to a panoramic image and video stitching method, a computer-readable storage medium, and a panoramic camera.

BACKGROUND OF THE INVENTION

At present, panoramic image stitching algorithms is generally based on feature point matching, such algorithms generally use key-point detector algorithms, specifically including: detecting key-points of two images through ORB, SURF and SIFT, and then using neighbor matching algorithm and RANSAC algorithm for matching and filtering feature points. However, the stitching algorithms based on feature point matching has the following disadvantages that: (1) easily produce mismatches, and some mismatches cannot be effectively removed, which will affect the final stitching result; (2) key-point detection and matching and filtering feature points based on RANSAC algorithm are inefficient, and cannot meet the needs of a panoramic camera for real-time stitching of panoramic images.

TECHNICAL PROBLEM

The present invention provides a panoramic image stitching method, a video stitching method, a computer-readable storage medium and a panoramic camera, which aim to solve the problem that: the stitching algorithms based on feature point matching are prone to mismatches, and some mismatches cannot be effectively removed, will affect the final stitching result; key-point detection and matching and filtering feature points based on RANSAC algorithm are inefficient, and cannot meet the needs of a panoramic camera for real-time stitching of panoramic images.

TECHNICAL SOLUTION

In the first aspect, the present invention provides a panoramic image stitching method, for fisheye photos captured by a panoramic camera with multiple lens, performing the following steps for fisheye photos captured by every two adjacent lenses:
S101, mapping fisheye photos captured by every two adjacent lenses to a corresponding stitching region of a sphere model to form two strip images with overlap;
S102, performing template matching on the two strip images to obtain an initial template matching result;
S103, performing matching and filtering on the initial template matching result using matching filtering algorithm based on region expansion to obtain a final matching result; and
S104, updating a mapping relationship between the fisheye photos and the corresponding stitching region of the sphere model according to the final matching result, and performing panoramic stitching according to the updated mapping relationship to obtain a seamless panoramic image.

In a second aspect, the present invention provides a panoramic image stitching method, wherein, performing the following steps for two fisheye photos with overlap:
S201, mapping two fisheye photos to a corresponding stitching region of a sphere model to form two strip images with overlap;
S202, performing template matching on the two strip images to obtain an initial template matching result;
S203, performing matching and filtering on the initial template matching result using matching filtering algorithm based on region expansion to obtain a final matching result; and
S204, updating a mapping relationship between the fisheye photos and the corresponding stitching region of the sphere model according to the final matching result, and performing panoramic stitching according to the updated mapping relationship to obtain a seamless panoramic image.

In a third aspect, the present invention provides a panoramic video stitching method, wherein a first frame of the panoramic video is stitched by the panoramic image stitching method in the second aspect.

In a fourth aspect, the present invention provides a panoramic video stitching method, wherein an intermediate frame of the panoramic video is stitched by the panoramic image stitching method in the second aspect, and before S2022, the method further comprises the following steps:
S2051, detecting a static region in the template strip image, wherein the static region is where the image frame is static or the matching state is stable;
S2052, analyzing the status queue of each final reliable matching block in the previous frame, and marking a failed row as the row of the final reliable matching block where the number of consecutive verification failures or rematch failures is greater than a preset threshold;
S2053, for each final reliable matching block in the previous frame, finding its corresponding block in the strip image to be matched according to its disparity, and calculating NCC values of these two equal-sized blocks, if the NCC value is greater than a preset threshold, then marking the final reliable matching block as successful verification, and updating the status queue of the final reliable matching block; otherwise, marking it as verification failure and updating the status queue of the final reliable matching block;
S2054, analyzing the status queue of the final reliable matching block of each row; for non-node frames, setting the row where the number of consecutive verification failures of the final reliable matching block is greater than the preset threshold as a rematching row; and for node frames, setting all rows in the non-static region as rematch rows; and
performing S2022, S2023, S203, and S204 for all rematching rows, and updating the status queue of the final reliable matching block, and marking the final reliable matching blocks in the rematched row where the rematch is successful as successful rematching, while marking the final reliable matching block in the rematched row where the rematch is failed as failed rematching.

Further, according to the method described in the fourth aspect, detecting a region in the template strip image where the image matching state is stable, specifically comprises:

analyzing the status queue of the template block, and marking a static region as the row of the template block where the number of successful verifications is greater than a preset threshold and variation of the NCC value is less than a preset threshold.

In a fifth aspect, the present invention provides a computer-readable storage medium that stores one or more computer programs, when the one or more computer programs are executed by one or more processors, cause the one or more processors to perform the steps of the panoramic image stitching method described in the first aspect or the second aspect; and the computer-readable storage medium may be a non-transitory computer-readable storage medium.

In a sixth aspect, the present invention provides a computer-readable storage medium that stores one or more computer programs, when the one or more computer programs are executed by one or more processors, cause the one or more processors to perform the steps of the panoramic video stitching method described in the third aspect or the fourth aspect; and the computer-readable storage medium may be a non-transitory computer-readable storage medium.

In a seventh aspect, the present invention provides a panoramic camera, comprising: one or more processors; a memory, and one or more computer programs. The one or more processors and the memory are connected by a bus, wherein the one or more computer programs are stored in the memory and configured to be executed by the one or more processors, characterized in that, when the one or more processors execute the computer programs, perform the steps of the panoramic image stitching method described in the first aspect or the second aspect.

In an eighth aspect, the present invention provides a panoramic camera, comprising: one or more processors; a memory, and one or more computer programs. The one or more processors and the memory are connected by a bus, wherein the one or more computer programs are stored in the memory and configured to be executed by the one or more processors, characterized in that, when the one or more processors execute the computer programs, perform the steps of the panoramic video stitching method described in the third aspect or the fourth aspect.

ADVANTAGES

In the method of the present invention, mapping fisheye photos captured by two adjacent lenses are mapped to corresponding stitching regions of a sphere model to form two strip images with overlap; performing template matching on the two strip images to obtain an initial template matching result; performing matching and filtering on the initial template matching result using matching filtering algorithm based on region expansion to obtain a final matching result; and updating a mapping relationship between the fisheye photos and the corresponding stitching regions of the sphere model, and performing panoramic stitching according to the updated mapping relationship to obtain a seamless panoramic image. The method of the present invention has high efficiency, and can satisfy the requirements for real-time stitching of a panoramic image by a mobile terminal; has an accurate and stable feature matching result, and can achieve a good effect of seamless stitching; and when the method being applied to video stitching, it has a stable matching effect and certain robustness, and can be well applied to a scenario in which the dynamic view, static view, distant view, and close view are changed alternately.

and

Figure 7:
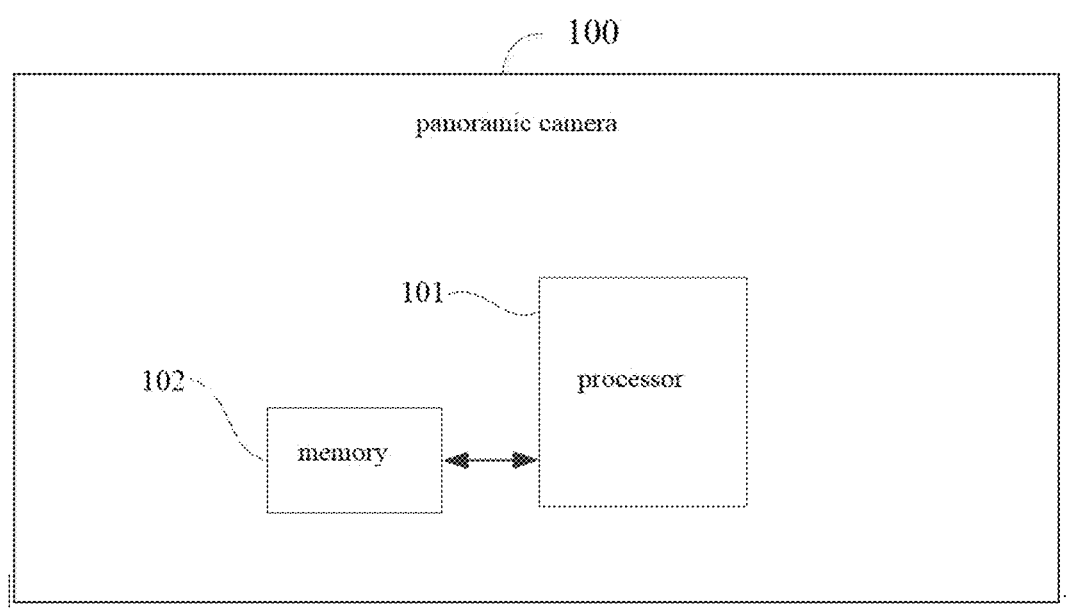

FIG. 7 is a block diagram of a panoramic camera provided in the second fourth embodiment of the present invention.

DETAILED DESCRIPTION OF THE INVENTION

In order to make the objects, technical solutions, and advantages of the present invention clearer, the following further describes the present invention in detail with reference to the accompanying drawings and embodiments. It should be understood that the specific embodiments described here are only used to explain the present invention, but not used to limit the present invention.

In order to illustrate the technical solutions of the present invention, specific embodiments are described below.

First Embodiment

Figure 1:
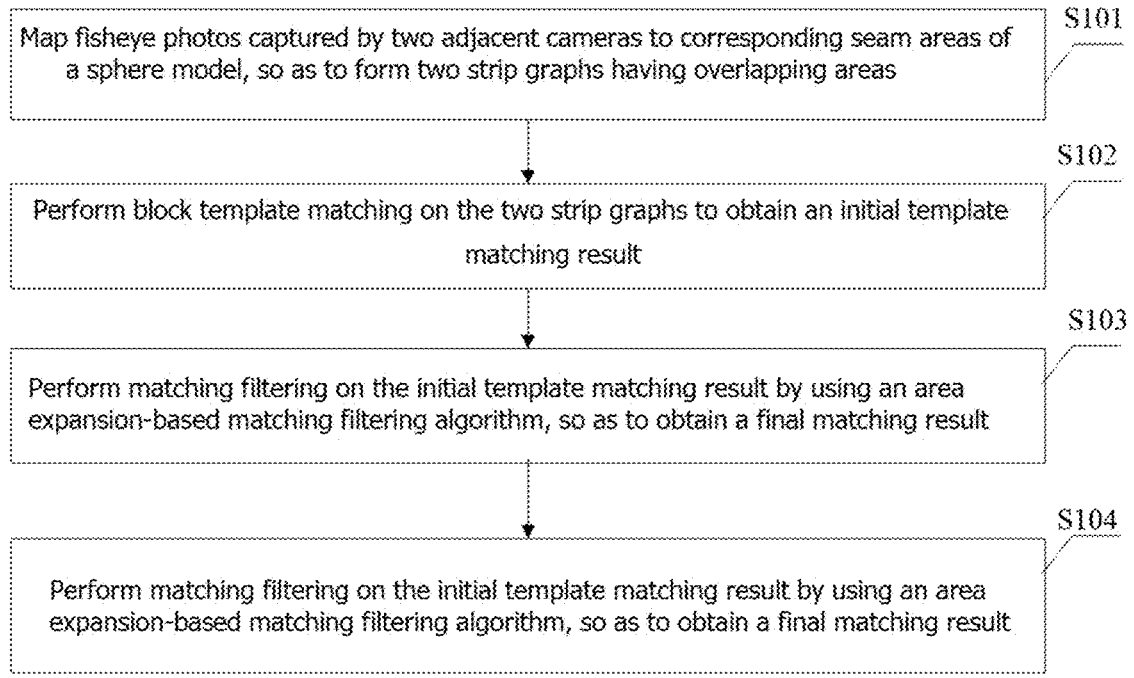
FIG. 1 is a flowchart of a panoramic image stitching method provided in accordance with a first embodiment of the present invention.

Referring to FIG. 1, the first embodiment of the present invention provides a panoramic image stitching method, in which, for fisheye photos captured by a panoramic camera with multiple lens, perform the following steps for each fisheye photo captured by every two adjacent lenses.

S101, mapping fisheye photos captured by every two adjacent lenses to a corresponding stitching region of a sphere model to form two strip images with overlap.

S102, performing template matching on the two strip images to obtain an initial template matching result.

In the first embodiment of the present invention, the following steps may be further included before S102:

performing Gaussian blur on the two strip images to reduce photo noise and improve matching accuracy; and/or performing Canny edge detection on the two strip images to obtain image gradient information for subsequent elimination of non-texture region.

Figure 3:
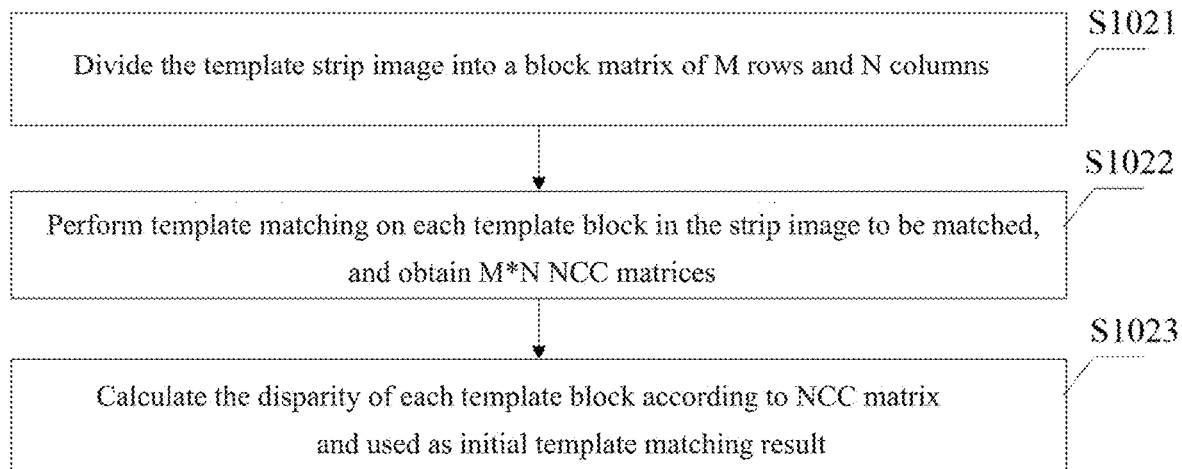
FIG. 3 is a flowchart of S102 in the panoramic image stitching method provided in the first embodiment of the present invention.
Figure 6:
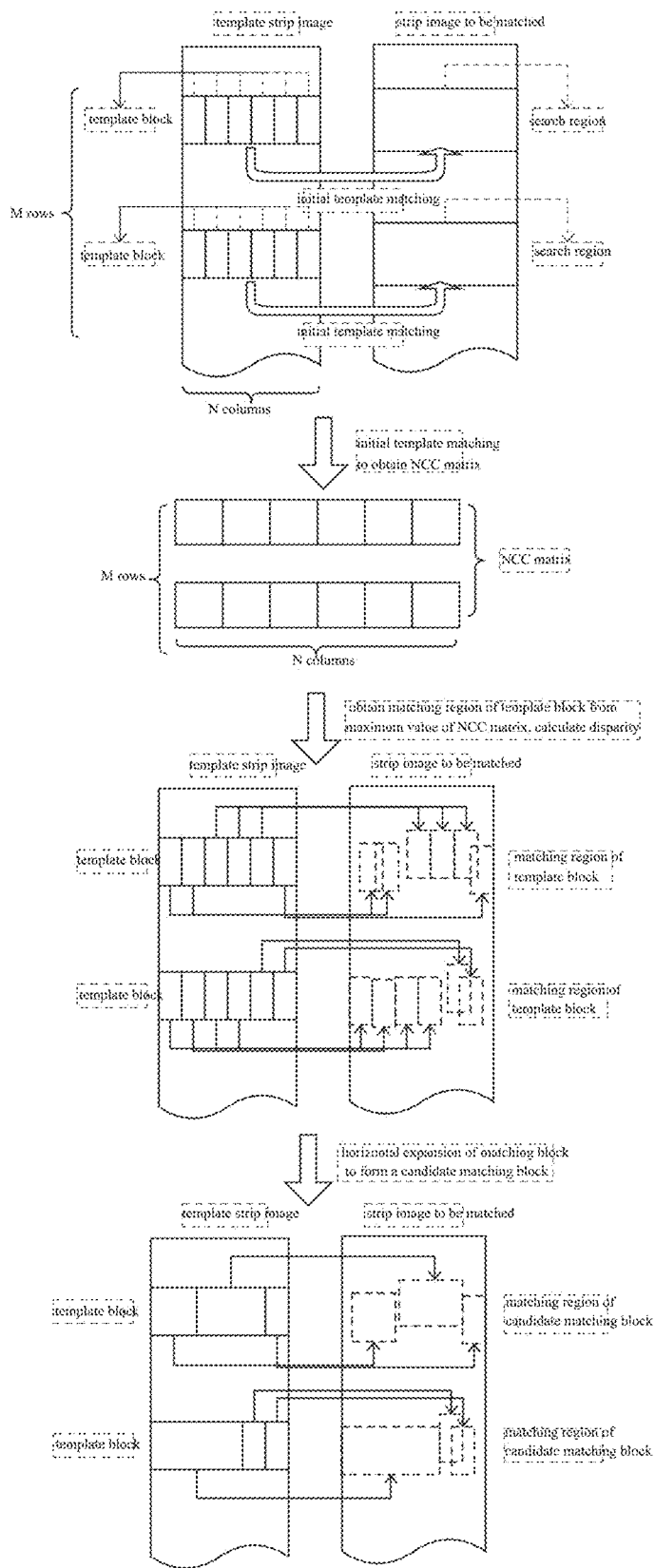
FIG. 6 is a schematic diagram of the process of S102 and S1031 in the panoramic image stitching method provided in the first embodiment of the present invention, or S202 and S2031 in the panoramic image stitching method provided in the second embodiment of the present invention.

Referring to FIG. 3 and FIG. 6, in the first embodiment of the present invention, S102 may specifically include the following steps of S1021 to S1023:

S1021, selecting one strip image as a template strip image, and the other strip image as a strip image to be matched, dividing the template strip image into a block matrix of M rows and N columns, and determining each block in the block matrix as a template block; where adjacent rows in the block matrix have overlapping parts, and the block matrix covers the entire template strip image; and dividing the strip image to be matched into M rows of block regions, where adjacent rows in the block region have overlapping parts, and M and N are positive integers greater than 1;

S1022, performing template matching on each template block in the strip image to be matched, where a matching region is a whole row in the strip image to be matched corresponding to the same row of the template block, and obtaining an NCC (Normalization cross correlation) matrix for each template block after template matching, and thereby obtaining M*N NCC matrices;

S1023, searching for a maximum value in each NCC matrix, calculating a center position of the template block in a corresponding region of the strip image to be matched based on a position of the maximum value in the NCC matrix; and then calculating a disparity of the template block according to a center position of a known template block in the template strip image, whereby obtaining the disparity of each template block as the initial template matching result.

In the first embodiment of the present invention, the maximum value in S1023 may be greater than a set NCC threshold (for example, 0.8).

In the first embodiment of the present invention, the template block in S1021 is a valid template block, and the valid template block is determined in the following manner:

calculating a texture value of each matching block according to the image gradient information obtained by Canny edge detection, and marking the matching block as a valid template block if the texture value is greater than a preset threshold.

S103, performing matching and filtering on the initial template matching result using matching filtering algorithm based on region expansion to obtain a final matching result.

Figure 5:
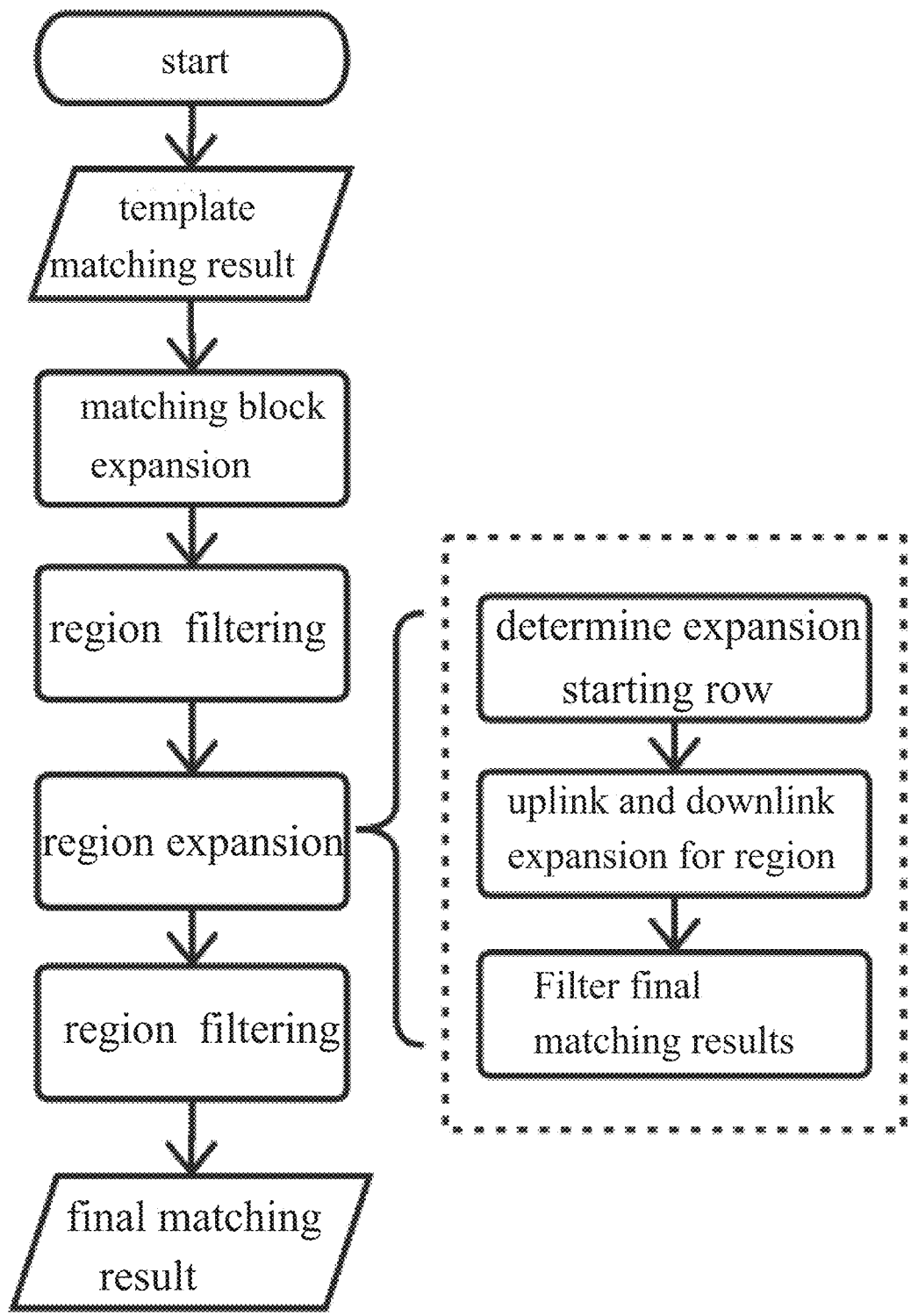
FIG. 5 is a flowchart of S103 in the panoramic image stitching method provided in the first embodiment of the present invention, or S203 in the panoramic image stitching method provided in the second embodiment of the present invention.

Referring to FIG. 5 and FIG. 6, in the first embodiment of the present invention, S103 may specifically include the following steps of S1031 to S1034:

S1031, for each template block, using the NCC matrix to perform left and right bidirectional expansion in the same row to form a candidate matching block; constructing a matching reliability M for each candidate matching block based on a disparity consistency, a width of the candidate matching block and the NCC matrix with a preset weight ratio; sorting the candidate matching blocks in each row according to the matching reliability M, and selecting the candidate matching block with the highest matching reliability as the reliable matching block of the row.

A method for expanding is: when each template block is used as a matching block and the disparity of one matching block is used as the disparity of another matching block, and the NCC value of the other matching block is still greater than the preset threshold (0.8), then these two matching blocks are merged into one matching block.

S1032, according to the disparity consistency of the reliable matching blocks, clustering the reliable matching blocks to obtain multiple regions, where the difference between the x components of the disparity of adjacent rows in the same region does not exceed the preset threshold (which is a width of the smallest reliable matching block in experiment); filtering the regions according to the region size (for example, the number of rows contained in the region), and deleting the region that contain less than the preset number of rows (for example, 3 rows, 4 rows, etc.) (including deleting the reliable matching block in these rows); setting the rows that have not form a region as failed rows; and again clustering the reliable matching blocks according to the disparity consistency thereof, and updating the region information.

S1033, performing uplink and downlink expansion for each region, specifically comprising the following steps of S10331 to S10333:

S10331, determining an expansion starting row: for each row, constructing a row reliability value with a preset weight according to the consistency of the disparity of the reliable matching block and a regional average value and the reliability of the reliable matching block; sorting each row according to the row reliability value; and selecting the row with the row reliability value in a preset number (for example, the top 10 rows) as the expansion starting row;

S10332, performing up and down bidirectional expansion for each expansion starting row;

for each candidate matching block in the row to be expanded, calculating a disparity consistency measure C between an optimal match block of a current expansion row and the candidate matching block, if the disparity consistency measure C is greater than a preset disparity consistency threshold, updating the disparity consistency measure C to the matching reliability M of the candidate matching block with the preset weight, sorting all candidate matching blocks of the row to be expanded according to the matching reliability M, and selecting the candidate matching block with the largest M value to be included in the current expansion region. If the disparity consistency measure C between an optimal match block of a current expansion row and any candidate matching block in the row to be expanded is less than the preset disparity consistency threshold, interrupting the expansion of the current region, so that each region can get multiple candidate expansion regions.

S10333, constructing a regional matching reliability for each candidate expansion region based on the average matching reliability of the candidate matching blocks contained in the region and the size of the region; and assigning the matching reliability M of all candidate matching blocks in the region using the regional matching reliability, and marking all candidate matching blocks in the region as regional reliable matching blocks; for multiple regional reliable matching blocks in each row, selecting the regional reliable matching block with the largest matching reliability M as the final reliable matching block of the row, wherein the disparity corresponding to the final reliable matching block is the final disparity of the row.

S1034, performing S1032 again.

S104, updating a mapping relationship between the fisheye photos and the corresponding stitching region of the sphere model according to the final matching result, and performing panoramic stitching according to the updated mapping relationship to obtain a seamless panoramic image.

S104 specifically comprises: updating a mapping relationship between the fisheye photos to the corresponding stitching region of the sphere model according to the final reliable matching block of each row and the disparity corresponding to the final reliable matching block, and performing panoramic stitching according to the updated mapping relationship to obtain a seamless panoramic image.

When the panoramic image stitching method provided in the first embodiment of the present invention is applied to panoramic video stitching, the panoramic image stitching method provided in the first embodiment of the present invention is applicable to the first frame of the panoramic video, that is, the fisheye photo is the first frame of the panoramic video; while for the intermediate frame of the panoramic video, before S1022, the method further comprises the following steps:

S1051, detecting a static region in the template strip image, wherein the static region is where the image frame is static or the matching state is stable;

detecting the region where the image matching state is stable, specifically comprises:

analyzing the status queue of the template block, and marking a static region as the row of the template block where the number of successful verifications is greater than a preset threshold (for example, 8 times, 9 times, etc.) and variation of the NCC value is less than a preset threshold (for example, 0.03, 0.05, etc.).

S1052, analyzing the status queue of each final reliable matching block in the previous frame, and marking a failed row as the row of the final reliable matching block where the number of consecutive verification failures or rematch failures is greater than a preset threshold (for example, 3 times, 5 times, etc.); and the failed row will not become a rematch row again until the next node frame arrives.

The final reliable matching block has four states: successful verification, verification failure, successful rematching, and failed rematching.

S1053, for each final reliable matching block in the previous frame, finding its corresponding block in the strip image to be matched according to its disparity, and calculating NCC values of these two equal-sized blocks, if the NCC value is greater than a preset threshold, then marking the final reliable matching block as successful verification, and updating the status queue of the final reliable matching block; otherwise, marking it as verification failure and updating the status queue of the final reliable matching block;

S1054, analyzing the status queue of the final reliable matching block of each row; for non-node frames, setting the row where the number of consecutive verification failures of the final reliable matching block is greater than the preset threshold (for example, 1 time in the non-static region, 3 times in the static region) as a rematching row; and for node frames, setting all rows in the non-static region as rematch rows; where the node frame refers to a frame set every n frames (for example, 20 frames, 30 frames, etc.) from the first frame.

performing S1022, S1023, S103, and S104 for all rematching rows, and updating the status queue of the final reliable matching block, and marking the final reliable matching blocks in the rematched row where the rematch is successful as successful rematching, while marking the final reliable matching block in the rematched row where the rematch is failed as failed rematching.

In the method of the present invention, mapping fisheye photos captured by two adjacent lenses to corresponding stitching regions of a sphere model to form two strip images with overlap;

performing template matching on the two strip images to obtain an initial template matching result;

performing matching and filtering on the initial template matching result using matching filtering algorithm based on region expansion to obtain a final matching result; and updating a mapping relationship between the fisheye photos and the corresponding stitching regions of the sphere model, and performing panoramic stitching according to the updated mapping relationship to obtain a seamless panoramic image. The method of the present invention has high efficiency, and can satisfy the requirements for real-time stitching of a panoramic image by a mobile terminal; has an accurate and stable feature matching result, and can achieve a good effect of seamless stitching; and when the method being applied to video stitching, it has a stable matching effect and certain robustness, and can be well applied to a scenario in which the dynamic view, static view, distant view, and close view are changed alternately.

In addition, for each template block, using the NCC matrix to perform left and right bidirectional expansion in the same row by a matching filtering algorithm based on region expansion; clustering the reliable matching blocks by row to obtain multiple regions according to the disparity consistency of the reliable matching blocks, filtering the region according to the size of the region, performing uplink and downlink expansion for each region; and performing the steps once again: clustering the reliable matching blocks by row to obtain multiple regions according to the disparity consistency of the reliable matching blocks, filtering the region according to the size of the region, which greatly improves the accuracy and efficiency of matching filtering algorithm.

In addition, a dynamic video frame matching mechanism based on matching verification is: under this mechanism, for the first frame of the video, perform template matching and matching filtering on the entire strip image; while for intermediate frames, by means of matching verification and status queue, dynamically update rematching rows, only perform template matching and matching filtering on rematching rows, and perform static region detection and failed row marking. This mechanism reduces the matching fluctuation between adjacent frames, improves the stability of the matching, and improves the operating efficiency of the algorithm.

Second Embodiment

Figure 2:
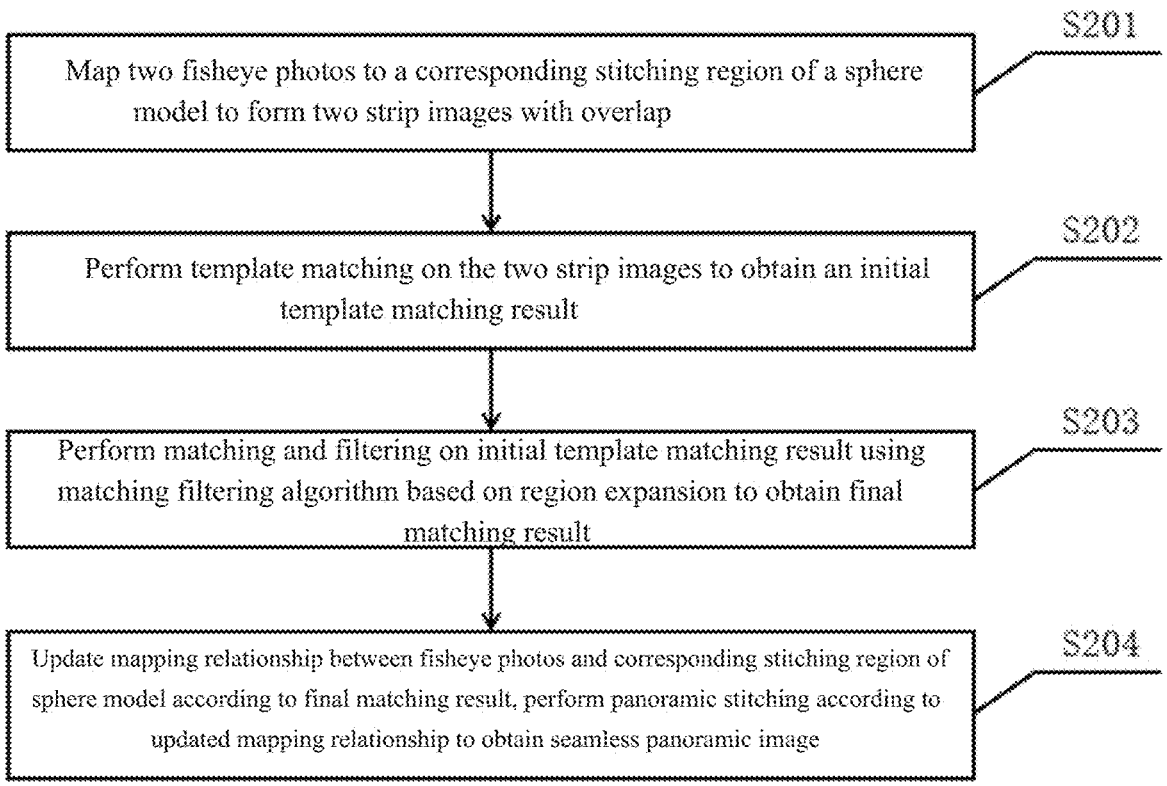
FIG. 2 is a flowchart of a panoramic image stitching method provided in accordance with a second embodiment of the present invention.

Referring to FIG. 2, the second embodiment of the present invention provides a panoramic image stitching method, which performs the following steps on two fisheye photos with overlap:

S201, mapping two fisheye photos to a corresponding stitching region of a sphere model to form two strip images with overlap;

S202, performing template matching on the two strip images to obtain an initial template matching result;

In the second embodiment of the present invention, the following steps may be further included before S202:

performing Gaussian blur on the two strip images to reduce photo noise and improve matching accuracy.

Figure 4:
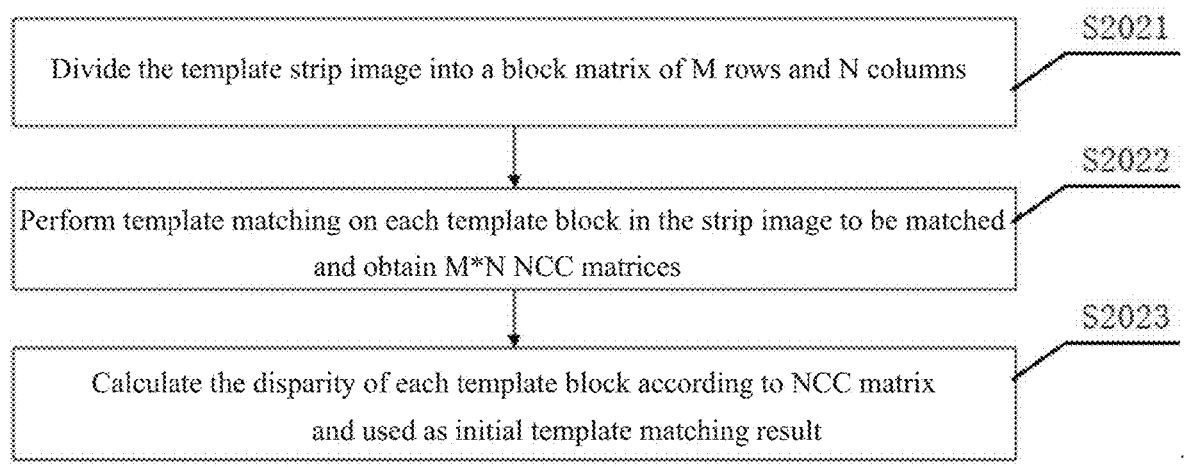
FIG. 4 is a flowchart of S202 in the panoramic image stitching method provided in the second embodiment of the present invention.

Referring to FIG. 4 and FIG. 6, in the second embodiment of the present invention, S202 may specifically include the following steps:

S2021, selecting one strip image as a template strip image, and the other strip image as a strip image to be matched, dividing the template strip image into a block matrix of M rows and N columns, and determining each block in the block matrix as a template block; where the adjacent rows in the block matrix have overlapping parts, and the block matrix covers the entire template strip image; dividing the strip image to be matched into M rows of block regions, where adjacent rows in the block regions have overlapping parts, and M and N are positive integers greater than 1;

S2022, performing template matching on each template block in the strip image to be matched, where a matching region is a whole row in the strip image to be matched corresponding to the same row of the template block, and obtaining an NCC (Normalization cross correlation) matrix for each template block after template matching, and thereby obtaining M*N NCC matrices;

S2023, searching for a maximum value in each NCC matrix, calculating a center position of the template block in a corresponding region of the strip image to be matched based on a position of the maximum value in the NCC matrix; and then calculating a disparity of the template block according to a center position of a known template block in the template strip image, whereby obtaining the disparity of each template block as the initial template matching result.

In the second embodiment of the present invention, the maximum value in S2023 may be a value greater than the set NCC threshold (for example, 0.8).

In the second embodiment of the present invention, the template block in S2021 is a valid template block, and the valid template block is determined in the following manner:

calculating a texture value of each matching block according to the image gradient information obtained by Canny edge detection, and marking the matching block as a valid template block if the texture value is greater than a preset threshold.

S203, performing matching and filtering on the initial template matching result using matching filtering algorithm based on region expansion to obtain a final matching result.

Referring to FIG. 5 and FIG. 6, in the second embodiment of the present invention, S203 may specifically include the following steps:

S2031, for each template block, using the NCC matrix to perform left and right bidirectional expansion in the same row to form a candidate matching block; constructing a matching reliability M for each candidate matching block based on a disparity consistency, a width of the candidate matching block and the NCC matrix with a preset weight ratio; sorting the candidate matching blocks in each row according to the matching reliability M, and selecting the candidate matching block with the highest matching reliability as the reliable matching block of the row.

A method for expanding is: when each template block is used as a matching block and the disparity of one matching block is used as the disparity of another matching block, and the NCC value of the other matching block is still greater than a preset threshold (0.8), then these two matching blocks are merged into one matching block.

S2032, according to the disparity consistency of the reliable matching blocks, clustering the reliable matching blocks to obtain multiple regions, where the difference between the x components of the disparity of adjacent rows in the same region does not exceed the preset threshold (which is a width of the smallest reliable matching block in experiment); filtering the regions according to the region size (for example, the number of rows contained in the region), and deleting the region that contain less than the preset number of rows (for example, 3 rows, 4 rows, etc.) (including deleting the reliable matching block in these rows); setting the rows that have not form a region as failed rows; and again clustering the reliable matching blocks according to the disparity consistency thereof, and updating the region information.

S2033, performing uplink and downlink expansion for each region, specifically comprising the following steps of S20331 to S20333:

S20331, determining an expansion starting row: for each row, constructing a row reliability value with a preset weight according to the consistency of the disparity of the reliable matching block and a regional average value and the reliability of the reliable matching block; sorting each row according to the row reliability value; and selecting the row with the row reliability value in a preset number (for example, the top 10 rows) as the expansion starting row;

S20332, performing up and down bidirectional expansion for each expansion starting row;

for each candidate matching block in the row to be expanded, calculating a disparity consistency measure C between an optimal match block of a current expansion row and the candidate matching block, if the disparity consistency measure C is greater than a preset disparity consistency threshold, updating the disparity consistency measure C to the matching reliability M of the candidate matching block with the preset weight, sorting all candidate matching blocks of the row to be expanded according to the matching reliability M, and selecting the candidate matching block with the largest M value to be included in the current expansion region. If the disparity consistency measure C between an optimal match block of a current expansion row and any candidate matching block in the row to be expanded is less than the preset disparity consistency threshold, interrupting the expansion of the current region, so that each region can get multiple candidate expansion regions.

S20333, constructing a regional matching reliability for each candidate expansion region based on the average matching reliability of the candidate matching blocks contained in the region and the size of the region; and assigning the matching reliability M of all candidate matching blocks in the region using the regional matching reliability, and marking all candidate matching blocks in the region as regional reliable matching blocks; for multiple regional reliable matching blocks in each row, selecting the regional reliable matching block with the largest matching reliability M as the final reliable matching block of the row, wherein the disparity corresponding to the final reliable matching block is the final disparity of the row.

S2034, performing S2032 again.

S204, updating a mapping relationship between the fisheye photos and the corresponding stitching region of the sphere model according to the final matching result, and performing panoramic stitching according to the updated mapping relationship to obtain a seamless panoramic image.

S204 specifically comprises: updating a mapping relationship between the fisheye photos to the corresponding stitching region of the sphere model according to the final reliable matching block of each row and the disparity corresponding to the final reliable matching block, and performing panoramic stitching according to the updated mapping relationship to obtain a seamless panoramic image.

Third Embodiment

The third embodiment of the present invention provides a panoramic video stitching method, wherein a first frame of the panoramic video is stitched by any of the panoramic image stitching methods provided in the second embodiment.

Fourth Embodiment

The fourth embodiment of the present invention provides a panoramic video stitching method, wherein an intermediate frame of the panoramic video is stitched by any of the panoramic image stitching methods provided in the second aspect, and before S2022, the method further comprises the following steps:

S2051, detecting a static region in the template strip image, wherein the static region is where the image frame is static or the matching state is stable.

Detecting a region in the template strip image where the image matching state is stable, specifically comprises:

analyzing the status queue of the template block, and marking a static region as the row of the template block where the number of successful verifications is greater than a preset threshold (for example, 8 times, 9 times, etc.) and variation of the NCC value is less than a preset threshold (for example, 0.03, 0.05, etc.).

S2052, analyzing the status queue of each final reliable matching block in the previous frame, and marking a failed row as the row of the final reliable matching block where the number of consecutive verification failures or rematch failures is greater than a preset threshold (for example, 3 times, 5 times, etc.); and the failed row will not become a rematch row again until the next node frame arrives.

The final reliable matching block has four states: successful verification, verification failure, successful rematching, and failed rematching.

S2053, for each final reliable matching block in the previous frame, finding its corresponding block region in the strip image to be matched according to its disparity, and calculating NCC values of these two equal-sized blocks, if the NCC value is greater than a preset threshold, then marking the final reliable matching block as successful verification, and updating the status queue of the final reliable matching block; otherwise, marking it as verification failure and updating the status queue of the final reliable matching block.

S2054, analyzing the status queue of the final reliable matching block of each row; for non-node frames, setting the row where the number of consecutive verification failures of the final reliable matching block is greater than the preset threshold (for example, 1 time in the non-static region, 3 times in the static region) as a rematching row; and for node frames, setting all rows in the non-static region as rematch rows; where the node frame refers to a frame set every n frames (for example, 20 frames, 30 frames, etc.) from the first frame.

performing S2022, S2023, S203, and S204 for all rematching rows, and updating the status queue of the final reliable matching block, and marking the final reliable matching blocks in the rematched row where the rematch is successful as successful rematching, while marking the final reliable matching block in the rematched row where the rematch is failed as failed rematching.

In the method of the present invention, mapping two fisheye photos to corresponding stitching regions of a sphere model to form two strip images with overlap; performing template matching on the two strip images to obtain an initial template matching result; performing matching and filtering on the initial template matching result using matching filtering algorithm based on region expansion to obtain a final matching result; and updating a mapping relationship between the fisheye photos and the corresponding stitching regions of the sphere model, and performing panoramic stitching according to the updated mapping relationship to obtain a seamless panoramic image. The method of the present invention has high efficiency, and can satisfy the requirements for real-time stitching of a panoramic image by a mobile terminal; has an accurate and stable feature matching result, and can achieve a good effect of seamless stitching; and when the method being applied to video stitching, it has a stable matching effect and certain robustness, and can be well applied to a scenario in which the dynamic view, static view, distant view, and close view are changed alternately.

In addition, for each template block, using the NCC matrix to perform left and right bidirectional expansion in the same row by a matching filtering algorithm based on region expansion; clustering the reliable matching blocks by row to obtain multiple regions according to the disparity consistency of the reliable matching blocks, filtering the region according to the size of the region, performing uplink and downlink expansion for each region; and performing the steps once again: clustering the reliable matching blocks by row to obtain multiple regions according to the disparity consistency of the reliable matching blocks, filtering the region according to the size of the region; which greatly improves the accuracy and efficiency of matching filtering algorithm.

In addition, a dynamic video frame matching mechanism based on matching verification is:

under this mechanism, for the first frame of the video, perform template matching and matching filtering on the entire strip image; while for intermediate frames, by means of matching verification and status queue, dynamically update rematching rows, only perform template matching and matching filtering on rematching rows, and perform static region detection and failed row marking. This mechanism reduces the matching fluctuation between adjacent frames, improves the stability of the matching, and improves the operating efficiency of the algorithm.

Fifth Embodiment

The fifth embodiment of the present invention provides a computer-readable storage medium, the computer-readable storage medium stores one or more computer programs, when the one or more computer programs are executed by a processor, cause the one or more processors to perform the steps of a panoramic image stitching method provided in the first embodiment or the second embodiment. The computer-readable storage medium may be a non-transitory computer-readable storage medium.

Sixth Embodiment

The sixth embodiment of the present invention provides a computer-readable storage medium, the computer-readable storage medium stores one or more computer programs, when the one or more computer programs are executed by a processor, cause the one or more processors to perform the steps of the panoramic video stitching method described in the third embodiment or the fourth embodiment. The computer-readable storage medium may be a non-transitory computer-readable storage medium.

Seventh Embodiment

FIG. 7 shows a block diagram of a portable terminal provided in the fifth embodiment of the present invention. A portable terminal 100 comprises: one or more processors 101, a memory 102, and one or more computer programs. The one or more processors 101 and the memory 102 are connected by a bus, the one or more computer programs are stored in the memory 102 and are configured to be executed by the one or more processors 101, and when the one or more processors 101 execute the one or more computer programs, perform the steps of a panoramic image stitching method provided in the first or second embodiment of the present invention are implemented.

Eighth Embodiment

FIG. 7 shows a block diagram of a portable terminal provided in the sixth embodiment of the present invention. A portable terminal 100 comprises: one or more processors 101, a memory 102, and one or more computer programs. The one or more processors 101 and the memory 102 are connected by a bus, the one or more computer programs are stored in the memory 102 and are configured to be executed by the one or more processors 101, and when the one or more processors 101 execute the one or more computer programs, perform the steps of a panoramic image stitching method provided in the third or fourth embodiment of the present invention are implemented.

A person of ordinary skill in the art can understand that all or part of the steps in the various methods of the above-mentioned embodiments can be completed by one or more computer programs instructing relevant hardware, and the one or more computer programs can be stored in a computer-readable storage medium. The computer-readable storage medium may include: Read Only Memory (ROM), Random Access Memory (RAM), magnetic disk or optical disk, etc.

The foregoing descriptions are only preferred embodiments of the present invention, and are not intended to limit the present invention. Any modification, equivalent replacement, and improvement made within the spirit and principle of the present invention should be included within the protection scope of the present invention.

What is claimed is:

1. A panoramic image stitching method, wherein, the method is used for stitching fisheye photos captured by a panoramic camera with multiple lens, or the method is used for stitching two fisheye photos with overlap, comprises steps of:
   S101, mapping fisheye photos captured by every two adjacent lenses to a corresponding stitching region of a sphere model to form two strip images with overlap, or,
   S201, mapping two fisheye photos with overlap to a corresponding stitching region of a sphere model to form two strip images with overlap;
   S102/S202, performing template matching on the two strip images to obtain an initial template matching result, wherein the performing template matching on the two strip images step comprises steps of:
      S1021/S2021, selecting one strip image as a template strip image, and the other strip image as a strip image to be matched, dividing the template strip image into a block matrix of M rows and N columns, and determining each block in the block matrix as a template block, where adjacent rows in the block matrix have overlapping parts, and the block matrix covers the entire template strip image; and dividing the strip image to be matched into M rows of block regions, where adjacent rows in the block region have overlapping parts, and M and N are positive integers greater than 1;
      S1022/S2022, performing template matching on each template block in the strip image to be matched, where a matching region is a whole row in the strip image to be matched corresponding to the same row of the template block, and obtaining a normalized cross correlation (NCC) matrix for each template block after template matching, whereby obtaining M*N NCC matrices; and
      S1023/S2023, searching for a maximum value in each NCC matrix, calculating a center position of the template block in a corresponding region of the strip image to be matched based on a position of the maximum value in the NCC matrix; and then calculating a disparity of the template block according to a center position of a known template block in the template strip image, whereby obtaining the disparity of each template block as the initial template matching result;
   S103/S203, performing matching and filtering on the initial template matching result using matching filtering algorithm based on region expansion to obtain a final matching result, wherein the S103/S203 comprises the step of:
      S1031/S2031, for each template block, using the NCC matrix to perform left and right bidirectional expansion in the same row to form a candidate matching block; constructing a matching reliability M for each candidate matching block based on a disparity consistency, a width of the candidate matching block and the NCC matrix with a preset weight ratio; sorting the candidate matching blocks in each row according to the matching reliability M, and selecting the candidate matching block with the highest matching reliability as a reliable matching block of the row; and
   S104/S204, updating a mapping relationship between the fisheye photos and the corresponding stitching region of the sphere model according to the final matching result, and performing panoramic stitching according to the updated mapping relationship to obtain a seamless panoramic image.

2. The method of claim 1, further comprising the following step before S102/S202:
   performing Gaussian blur on the two strip images.

3. The method of claim 1, wherein the template block in S1021/2021 is a valid template block, and the valid template block is determined in the following manner:
   calculating a texture value of each matching block according to the image gradient information obtained by Canny edge detection, and marking the matching block as a valid template block if the texture value is greater than a preset threshold.

4. The method of claim 1, wherein S103/S203 comprises further steps of:
   S1032/S2032, according to the disparity consistency of the reliable matching blocks, clustering the reliable matching blocks to obtain multiple regions, where a difference between the x components of the disparity of adjacent rows in the same region does not exceed a preset threshold; filtering the regions according to a size of the region, and deleting the region that contain less than the preset number of rows; setting the rows that have not form a region as failed rows; and again clustering the reliable matching blocks according to the disparity consistency thereof, and updating the region information;

S1033/S2033, performing uplink and downlink expansion for each region; and

S1034/S2034, performing S1032/S2032 again.

5. The method of claim 4, wherein S1033/S2033 comprises steps of:

S10331/S20331, determining an expansion starting row: for each row, constructing a row reliability value with a preset weight according to the consistency of the disparity of the reliable matching block and a regional average value and the reliability of the reliable matching block; sorting each row according to the row reliability value; and selecting the row with the row reliability value in a preset number as the expansion starting row;

S10332/S20332, performing up and down bidirectional expansion for each expansion starting row; for each candidate matching block in the row to be expanded, calculating a disparity consistency measure between an optimal match block of a current expansion row and the candidate matching block, if the disparity consistency measure is greater than a preset disparity consistency threshold, updating the disparity consistency measure to the matching reliability of the candidate matching block with the preset weight, sorting all candidate matching blocks of the row to be expanded according to the matching reliability, and selecting the candidate matching block with the largest matching reliability to be included in the current expansion region; if the disparity consistency measure between an optimal match block of a current expansion row and any candidate matching block in the row to be expanded is less than the preset disparity consistency threshold, interrupting the expansion of the current region, whereby each region can get multiple candidate expansion regions; and S10333/S20333, constructing a regional matching reliability for each candidate expansion region based on the average matching reliability of the candidate matching blocks contained in the region and a size of the region; and assigning the matching reliability of all candidate matching blocks in the region using the regional matching reliability, and marking all candidate matching blocks in the region as regional reliable matching blocks; for multiple regional reliable matching blocks in each row, selecting the regional reliable matching block with the largest matching reliability as a final reliable matching block of the row, wherein the disparity corresponding to the final reliable matching block is the final disparity of the row.

6. The method of claim 5, wherein S104/S204 is: updating a mapping relationship between the fisheye photos to the corresponding stitching region of the sphere model according to the final reliable matching block of each row and the disparity corresponding to the final reliable matching block, and performing panoramic stitching according to the updated mapping relationship to obtain a seamless panoramic image.

7. The method of claim 6, wherein when the panoramic image stitching method is applied to panoramic video stitching, the panoramic image stitching method is applicable to the first frame of the panoramic video, that is, the fish-eye photo corresponding to the first frame of the panoramic video; while for the intermediate frame of the panoramic video, before S1022, the method further comprises steps of:

S1051, detecting a static region in the template strip image, wherein the static region is where the image frame is static or the matching state is stable;

S1052, analyzing the status queue of each final reliable matching block in the previous frame, and marking a failed row as the row of the final reliable matching block where the number of consecutive verification failures or rematch failures is greater than a preset threshold;

S1053, for each final reliable matching block in the previous frame, finding its corresponding block in the strip image to be matched according to its disparity, and calculating NCC values of these two equal-sized blocks, if the NCC value is greater than a preset threshold, then marking the final reliable matching block as successful verification, and updating the status queue of the final reliable matching block; otherwise, marking it as verification failure and updating the status queue of the final reliable matching block;

S1054, analyzing the status queue of the final reliable matching block of each row; for non-node frames, setting the row where the number of consecutive verification failures of the final reliable matching block is greater than a preset threshold as a rematching row; and for node frames, setting all rows in the non-static region as rematch rows; and performing S1022, S1023, S103, and S104 for all rematching rows, and updating the status queue of the final reliable matching block, and marking the final reliable matching blocks in the rematched row where the rematch is successful as successful rematching, while marking the final reliable matching block in the rematched row where the rematch is failed as failed rematching.

8. The method of claim 7, wherein detecting a region in the template strip image where the image matching state is stable, comprises:

analyzing the status queue of the template block, and marking a static region as the row of the template block where the number of successful verifications is greater than a preset threshold and variation of the NCC value is less than a preset threshold.

9. A non-transitory computer-readable storage medium that stores one or more computer programs, wherein when the one or more computer programs are executed by one or more processors, cause the one or more processors to perform the steps of:

S101, mapping fisheye photos captured by every two adjacent lenses to a corresponding stitching region of a sphere model to form two strip images with overlap, or, S201, mapping two fisheye photos with overlap to a corresponding stitching region of a sphere model to form two strip images with overlap;

S102/S202, performing template matching on the two strip images to obtain an initial template matching result, wherein the performing template matching on the two strip images step comprises steps of:

S1021/S2021, selecting one strip image as a template strip image, and the other strip image as a strip image to be matched, dividing the template strip image into a block matrix of M rows and N columns, and determining each block in the block matrix as a template block, where adjacent rows in the block matrix have overlapping parts, and the block matrix covers the entire template strip image; and dividing the strip image to be matched into M rows of block regions, where adjacent rows in the block region have overlapping parts, and M and N are positive integers greater than 1;

S1022/S2022, performing template matching on each template block in the strip image to be matched, where a matching region is a whole row in the strip image to be matched corresponding to the same row of the template block, and obtaining a normalized cross correlation (NCC) matrix for each template block after template matching, whereby obtaining M*N NCC matrices; and S1023/S2023, searching for a maximum value in each NCC matrix, calculating a center position of the template block in a corresponding region of the strip image to be matched based on a position of the maximum value in the NCC matrix; and then calculating a disparity of the template block according to a center position of a known template block in the template strip image, whereby obtaining the disparity of each template block as the initial template matching result;

S103/S203, performing matching and filtering on the initial template matching result using matching filtering algorithm based on region expansion to obtain a final matching result, wherein the S103/S203 comprises the step of:

S1031/S2031, for each template block, using the NCC matrix to perform left and right bidirectional expansion in the same row to form a candidate matching block; constructing a matching reliability M for each candidate matching block based on a disparity consistency, a width of the candidate matching block and the NCC matrix with a preset weight ratio; sorting the candidate matching blocks in each row according to the matching reliability M, and selecting the candidate matching block with the highest matching reliability as a reliable matching block of the row; and S104/S204, updating a mapping relationship between the fisheye photos and the corresponding stitching region of the sphere model according to the final matching result, and performing panoramic stitching according to the updated mapping relationship to obtain a seamless panoramic image.

10. A panoramic camera, comprising:
one or more processors;
a memory, and one or more computer programs;
where the one or more processors and the memory are connected by a bus, the one or more computer programs are stored in the memory and configured to be executed by the one or more processors;
wherein when the one or more processors execute the computer programs, perform the steps of:

S101, mapping fisheye photos captured by every two adjacent lenses to a corresponding stitching region of a sphere model to form two strip images with overlap, or, S201, mapping two fisheye photos with overlap to a corresponding stitching region of a sphere model to form two strip images with overlap;

S102/S202, performing template matching on the two strip images to obtain an initial template matching result, wherein the performing template matching on the two strip images step comprises steps of:

S1021/S2021, selecting one strip image as a template strip image, and the other strip image as a strip image to be matched, dividing the template strip image into a block matrix of M rows and N columns, and determining each block in the block matrix as a template block, where adjacent rows in the block matrix have overlapping parts, and the block matrix covers the entire template strip image; and dividing the strip image to be matched into M rows of block regions, where adjacent rows in the block region have overlapping parts, and M and N are positive integers greater than 1;

S1022/S2022, performing template matching on each template block in the strip image to be matched, where a matching region is a whole row in the strip image to be matched corresponding to the same row of the template block, and obtaining a normalized cross correlation (NCC) matrix for each template block after template matching, whereby obtaining M*N NCC matrices; and S1023/S2023, searching for a maximum value in each NCC matrix, calculating a center position of the template block in a corresponding region of the strip image to be matched based on a position of the maximum value in the NCC matrix; and then calculating a disparity of the template block according to a center position of a known template block in the template strip image, whereby obtaining the disparity of each template block as the initial template matching result;

S103/S203, performing matching and filtering on the initial template matching result using matching filtering algorithm based on region expansion to obtain a final matching result, wherein the S103/S203 comprises the step of:

S1031/S2031, for each template block, using the NCC matrix to perform left and right bidirectional expansion in the same row to form a candidate matching block; constructing a matching reliability M for each candidate matching block based on a disparity consistency, a width of the candidate matching block and the NCC matrix with a preset weight ratio; sorting the candidate matching blocks in each row according to the matching reliability M, and selecting the candidate matching block with the highest matching reliability as a reliable matching block of the row; and S104/S204, updating a mapping relationship between the fisheye photos and the corresponding stitching region of the sphere model according to the final matching result, and performing panoramic stitching according to the updated mapping relationship to obtain a seamless panoramic image.

11. A panoramic video stitching method, used for stitching a first frame or intermediate frames of the panoramic video, comprising steps of:

S201, mapping two fisheye photos to a corresponding stitching region of a sphere model to form two strip images with overlap;

S202 performing template matching on the two strip images to obtain an initial template matching result, wherein the performing template matching on the two strip images step comprises steps of:

S2021, selecting one strip image as a template strip image, and the other strip image as a strip image to be matched, dividing the template strip image into a block matrix of M rows and N columns, and determining each block in the block matrix as a template block; where adjacent rows in the block matrix have overlapping parts, and the block matrix covers the entire template strip image; and dividing the strip image to be matched into M rows of block regions, where adjacent rows in the block region have overlapping parts, and M and N are positive integers greater than 1;

S2022, performing template matching on each template block in the strip image to be matched, where a matching region is a whole row in the strip image to be matched corresponding to the same row of the template block, and obtaining a normalized cross correlation (NCC) matrix for each template block after template matching, whereby obtaining M*N NCC matrices; and S2023, searching for a maximum value in each NCC matrix, calculating a center position of the template block in a corresponding region of the strip image to be matched based on a position of the maximum value in the NCC matrix; and then calculating a disparity of the template block according to a center position of a known template block in the template strip image, whereby obtaining the disparity of each template block as the initial template matching result;

S203 performing matching and filtering on the initial template matching result using matching filtering algorithm based on region expansion to obtain a final matching result, wherein the S203 comprises the step of:

S2031, for each template block, using the NCC matrix to perform left and right bidirectional expansion in the same row to form a candidate matching block; constructing a matching reliability M for each candidate matching block based on a disparity consistency, a width of the candidate matching block and the NCC matrix with a preset weight ratio; sorting the candidate matching blocks in each row according to the matching reliability M, and selecting the candidate matching block with the highest matching reliability as a reliable matching block of the row; and S204 updating a mapping relationship between the fisheye photos and the corresponding stitching region of the sphere model according to the final matching result and performing panoramic stitching according to the updated mapping relationship to obtain a seamless panoramic image.

12. The method of claim 11, when the method is used for stitching intermediate frames of the panoramic video are, before S2022, the method further comprises steps of:

S2051, detecting a static region in the template strip image, wherein the static region is where the image frame is static or the matching state is stable;

S2052, analyzing the status queue of each final reliable matching block in the previous frame, and marking a failed row as the row of the final reliable matching block where the number of consecutive verification failures or rematch failures is greater than a preset threshold;

S2053, for each final reliable matching block in the previous frame, finding its corresponding block in the strip image to be matched according to its disparity, and calculating NCC values of these two equal-sized blocks, if the NCC value is greater than a preset threshold, then marking the final reliable matching block as successful verification, and updating the status queue of the final reliable matching block; otherwise, marking it as verification failure and updating the status queue of the final reliable matching block;

S2054, analyzing the status queue of the final reliable matching block of each row; for non-node frames, setting the row where the number of consecutive verification failures of the final reliable matching block is greater than a preset threshold as a rematching row; and for node frames, setting all rows in the non-static region as rematch rows; and performing S2022, S2023, S203, and S204 for all rematching rows, and updating the status queue of the final reliable matching block, and marking the final reliable matching blocks in the rematched row where the rematch is successful as successful rematching, while marking the final reliable matching block in the rematched row where the rematch is failed as failed rematching.

13. The method of claim 12, wherein detecting a region in the template strip image where the image matching state is stable, comprises:

analyzing the status queue of the template block, and marking a static region as the row of the template block where the number of successful verifications is greater than a preset threshold and variation of the NCC value is less than a preset threshold.

14. A non-transitory computer-readable storage medium that stores one or more computer programs, wherein when the one or more computer programs are executed by one or more processors, cause the one or more processors to perform the steps of:

S201, mapping two fisheye photos to a corresponding stitching region of a sphere model to form two strip images with overlap;

S202 performing template matching on the two strip images to obtain an initial template matching result, wherein the performing template matching on the two strip images step comprises steps of:

S2021, selecting one strip image as a template strip image, and the other strip image as a strip image to be matched, dividing the template strip image into a block matrix of M rows and N columns, and determining each block in the block matrix as a template block; where adjacent rows in the block matrix have overlapping parts, and the block matrix covers the entire template strip image; and dividing the strip image to be matched into M rows of block regions, where adjacent rows in the block region have overlapping parts, and M and N are positive integers greater than 1;

S2022, performing template matching on each template block in the strip image to be matched, where a matching region is a whole row in the strip image to be matched corresponding to the same row of the template block, and obtaining a normalized cross correlation (NCC) matrix for each template block after template matching, whereby obtaining M*N NCC matrices; and S2023, searching for a maximum value in each NCC matrix, calculating a center position of the template block in a corresponding region of the strip image to be matched based on a position of the maximum value in the NCC matrix; and then calculating a disparity of the template block according to a center position of a known template block in the template strip image, whereby obtaining the disparity of each template block as the initial template matching result;

S203 performing matching and filtering on the initial template matching result using matching filtering algorithm based on region expansion to obtain a final matching result, wherein the S203 comprises the step of:

S2031, for each template block, using the NCC matrix to perform left and right bidirectional expansion in the same row to form a candidate matching block; constructing a matching reliability M for each candidate matching block based on a disparity consistency, a width of the candidate matching block and the NCC matrix with a preset weight ratio; sorting the candidate matching blocks in each row according to the matching reliability M, and selecting the candidate matching block with the highest matching reliability as a reliable matching block of the row; and S204 updating a mapping relationship between the fisheye photos and the corresponding stitching region of the sphere model according to the final matching result and performing panoramic stitching according to the updated mapping relationship to obtain a seamless panoramic image.

15. A panoramic camera, comprising: one or more processors; a memory, and one or more computer programs; where the one or more processors and the memory are connected by a bus, the one or more computer programs are stored in the memory and configured to be executed by the one or more processors; wherein when the one or more processors execute the computer programs, perform a panoramic video stitching method; the method used for stitching a first frame or intermediate frames of the panoramic video, comprising steps of:

S201, mapping two fisheye photos to a corresponding stitching region of a sphere model to form two strip images with overlap;

S202, performing template matching on the two strip images to obtain an initial template matching result, wherein the performing template matching on the two strip images step comprises steps of:

S2021, selecting one strip image as a template strip image, and the other strip image as a strip image to be matched, dividing the template strip image into a block matrix of M rows and N columns, and determining each block in the block matrix as a template block; where adjacent rows in the block matrix have overlapping parts, and the block matrix covers the entire template strip image; and dividing the strip image to be matched into M rows of block regions, where adjacent rows in the block region have overlapping parts, and M and N are positive integers greater than 1;

S2022, performing template matching on each template block in the strip image to be matched, where a matching region is a whole row in the strip image to be matched corresponding to the same row of the template block, and obtaining a normalized cross correlation (NCC) matrix for each template block after template matching, whereby obtaining M*N NCC matrices; and S2023, searching for a maximum value in each NCC matrix, calculating a center position of the template block in a corresponding region of the strip image to be matched based on a position of the maximum value in the NCC matrix; and then calculating a disparity of the template block according to a center position of a known template block in the template strip image, whereby obtaining the disparity of each template block as the initial template matching result;

S203, performing matching and filtering on the initial template matching result using matching filtering algorithm based on region expansion to obtain a final matching result, wherein the S203 comprises the step of:

S2031, for each template block, using the NCC matrix to perform left and right bidirectional expansion in the same row to form a candidate matching block; constructing a matching reliability M for each candidate matching block based on a disparity consistency, a width of the candidate matching block and the NCC matrix with a preset weight ratio; sorting the candidate matching blocks in each row according to the matching reliability M, and selecting the candidate matching block with the highest matching reliability as a reliable matching block of the row; and S204, updating a mapping relationship between the fisheye photos and the corresponding stitching region of the sphere model according to the final matching result and performing panoramic stitching according to the updated mapping relationship to obtain a seamless panoramic image.

* * * * *